US012662047B2

(12) United States Patent (10) Patent No.: US 12,662,047 B2
Mauritz et al. (45) Date of Patent: Jun. 23, 2026

(54) SHAPED PART AND METHOD FOR PRODUCING SUCH SHAPED PART

(71) Applicant: Novem Car Interior Design GmbH, Vorbach (DE)

(72) Inventors: Thomas Mauritz, Edelsfeld (DE); Alexander Martin, Neuhaus an der Pegnitz (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 18/785,754

(22) Filed: Jul. 26, 2024

(65) Prior Publication Data

US 2025/0100445 A1 Mar. 27, 2025

(30) Foreign Application Priority Data

Jul. 27, 2023 (DE) .......................... 102023120063.1

(51) Int. Cl.
B32B 21/04 (2006.01)
B29C 45/14 (2006.01)
(Continued)

(52) U.S. Cl.
CPC .......... B60Q 3/62 (2017.02); B29C 45/14344 (2013.01); B32B 3/266 (2013.01);
(Continued)

(58) Field of Classification Search
CPC ... B29C 45/14344; B32B 21/04; B32B 3/266; B32B 7/023; B60R 13/02; B23C 3/00;
(Continued)

(56) References Cited

U.S. PATENT DOCUMENTS 5,938,881 A * 8/1999 Kawata ............... B32B 37/1207
428/542.2

FOREIGN PATENT DOCUMENTS

DE 19859195 C2 2/2001
DE 102008028608 A1 12/2009
(Continued)

OTHER PUBLICATIONS

Search English translation of DE-202017104082-U1 (Year: 2018).*
(Continued)

*Primary Examiner* — Omar Rojas Cadima
(74) *Attorney, Agent, or Firm* — Burr & Forman

(57) ABSTRACT

The invention relates to a shaped part (10) comprising a decorative layer (11) with a decorative layer front side (12) formed as the visible side of the shaped part (10) and a decorative layer rear side (13) opposite the decorative layer front side (12), a carrier (14) arranged on the decorative layer rear side (13) with a carrier front side (15) facing the decorative layer rear side (13) and a carrier rear side (16) opposite the carrier front side (15), and one or more light sources (17), which are arranged on the carrier rear side (16) and/or in the carrier (14) and/or between the decorative layer rear side (13) and the carrier (14) for backlighting the decorative layer (11). The invention is characterized in that the carrier (14) is at least partially formed from a natural material (18). The invention further relates to a method for producing such a shaped part.

22 Claims, 1 Drawing Sheet

Figure 1:
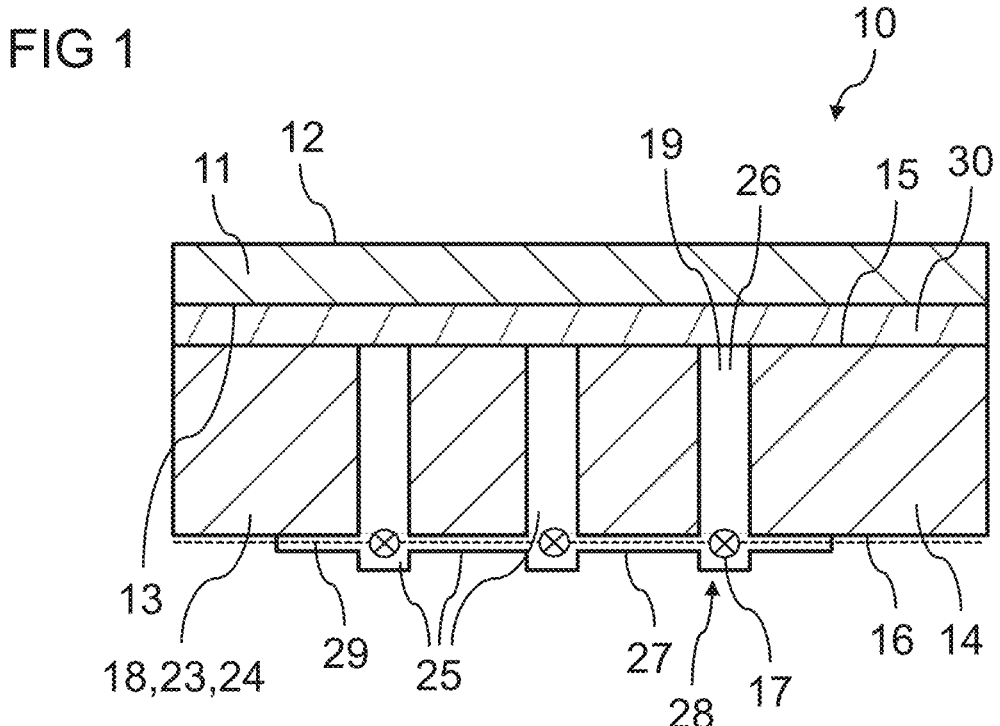

(51) Int. Cl.

| | |
|---|---|
| *B32B 3/26* | (2006.01) |
| *B32B 7/12* | (2006.01) |
| *B32B 27/32* | (2006.01) |
| *B60Q 3/62* | (2017.01) |
| *F21S 10/00* | (2006.01) |
| *B29L 11/00* | (2006.01) |
| *F21W 106/00* | (2018.01) |
| *F21Y 115/10* | (2016.01) |

(52) U.S. Cl.
CPC ................ *B32B 7/12* (2013.01); *B32B 21/04* (2013.01); *B32B 27/32* (2013.01); *F21S 10/005* (2013.01); *B29K 2995/0026* (2013.01); *B29L 2011/0075* (2013.01); *B32B 2605/003* (2013.01); *F21W 2106/00* (2018.01); *F21Y 2115/10* (2016.08)

(58) Field of Classification Search
CPC ....... B23K 26/382; B60Q 3/62; F21S 10/005; B29K 2995/0026; B29L 2011/0075
See application file for complete search history.

(56) References Cited

FOREIGN PATENT DOCUMENTS

| | | | | |
|---|---|---|---|---|
| DE | 102016106539 A1 | | 10/2017 | |
| DE | 102016114272 A1 | | 2/2018 | |
| DE | 202017104082 U1 * | 8/2018 | |
| DE | 102017115304 A1 | | 1/2019 | |
| DE | 102018103919 A1 * | 8/2019 | ............ B29C 39/10 |
| DE | 102021006588 A1 * | 12/2022 | |
| WO | WO-0220312 A2 * | 3/2002 | ............ B32B 27/04 |

OTHER PUBLICATIONS

Search English translation of DE 102018103919 A1 (Year: 2019).*
Search English translation of WO 0220312 A2 (Year: 2002).*
Search English translation of DE 102021006588 A1 (Year: 2022).*

* cited by examiner

SHAPED PART AND METHOD FOR PRODUCING SUCH SHAPED PART

The invention relates to a shaped part and to a method for producing such shaped part. The shaped part is in particular a decorative part (also: body trim part) and/or panel part designed as a shaped part for the vehicle interior.

Numerous decorative and panel parts are installed in the vehicle interior, for example door panels, console panels, and instrument panels. The decorative and panel parts also include control buttons and their covers.

Such shaped parts comprise a decorative layer with a decorative layer front side designed as the visible side of the shaped part and a decorative layer rear side opposite the decorative layer front side, a carrier arranged on the decorative layer rear side with a carrier front side facing the decorative layer rear side and a carrier rear side opposite the carrier front side, and one or more light sources that are arranged on the carrier rear side and/or in the carrier and/or between the decorative layer rear side and the carrier for backlighting the decorative layer.

It is known to design the carrier transparent or translucent, for example by injection molding from a transparent or translucent plastic. As a result, light emitted by light sources arranged on the carrier rear side or in the carrier can shine through the carrier and reach the decorative layer rear side, thus backlighting the decorative layer.

Natural materials, for example the wood layers of a wooden layer structure or bio-based materials such as natural fiber-reinforced plastics, are generally not sufficiently transparent or translucent as a carrier material to transmit light from light sources arranged on the carrier rear side or in the carrier through the carrier to the decorative layer rear side. In the case of a wooden layer structure, this is prevented by the two or more wood layers and/or the inherent color of the adhesive used, for example a bio-adhesive, to join the wood layers. In the case of natural fiber-reinforced plastics, this is prevented by the poorly translucent inherent color of the material and/or a high fiber content. Nevertheless, there is a desire to use such natural materials as a carrier material in shaped parts.

The invention is therefore based on the object of disclosing a new shaped part, in particular a sustainable shaped part, i.e., a shaped part with the lowest possible $CO_2$ footprint, with a decorative layer capable of being backlit. Furthermore, a method for producing this shaped part is to be specified.

This object is achieved in terms of the shaped part by a shaped part with the features of claim 1 and in terms of the method by a method with the features of claim 16. Advantageous embodiments and further developments are provided in each of the dependent claims.

The shaped part according to the invention comprises a decorative layer with a decorative layer front side designed as the visible side of the shaped part and a decorative layer rear side opposite the decorative layer front side, a carrier arranged on the decorative layer rear side with a carrier front side facing the decorative layer rear side and a carrier rear side opposite the carrier front side, and one or more light sources that are arranged on the carrier rear side and/or in the carrier and/or between the decorative layer rear side and the carrier for backlighting the decorative layer.

The invention provides that the carrier is formed at least partially, i.e., partially or completely, from one or more natural materials. In particular, the carrier is formed predominantly or completely from one or more natural materials. For example, at least 90%, in particular at least 95%, of the carrier is formed from one or more natural materials, wherein the percentage is based on the weight.

The advantages of the invention lie in particular in the fact that natural materials are used as a carrier material and nevertheless the backlighting of the decorative layer is made possible.

The shaped part is in particular a decorative part (also: body trim part) and/or panel part designed as a shaped part for the vehicle interior.

In one design variant, the decorative layer can be a translucent decorative layer. For example, the material of the decorative layer itself can be translucent. Alternatively or additionally, the decorative layer can have recesses and/or perforations and/or light passages for light to shine through.

For example, the decorative layer can comprise or consist of a wood veneer and/or a plastic (for example produced by IML (in-mold labeling) or FIM (film insert molding) or IMD (in-mold decoration)) and/or a film and/or a fabric and/or a textile layer and/or a material and/or a carbon and/or a stone layer and/or a slate layer and/or a marble layer.

It can be provided that a transparent or translucent protective and/or optical layer 31 is arranged on the front side of the decorative layer, wherein the protective and/or optical layer 31 for example comprises lacquer or polyurethane (PUR) or plastics material or is formed from a lacquer or polyurethane (PUR) or plastics material. For arranging a protective and/or optical layer 31 made of PUR or plastics material on the front side of the decorative layer, PUR or plastics material is preferably poured onto the front side.

One configuration of the invention provides that the natural material of the carrier is wood and the carrier is a wooden layer structure, which comprises two or more wood layers bonded together over their surface via a layer structure adhesive layer in each case. The adhesive of the layer structure adhesive layer can, for example, be a bio-adhesive, i.e., a bio-based adhesive. An example of a suitable bio-adhesive is resin, for example liquid resin, in particular sprayable resin, or for example resin as an adhesive film. Other adhesives can also be used as an alternative to bio-based adhesives.

According to one embodiment of the invention, the natural material of the carrier is a bio-based material. The bio-based material can be a natural fiber-reinforced plastic, for example a natural fiber-reinforced polypropylene (abbreviation: NFPP). The natural fibers used for reinforcement can be flax fibers and/or hemp fibers and/or kenaf fibers and/or sisal fibers, for example.

If the one or more light sources are arranged between the decorative layer rear side and the carrier, the following further developments are possible: The one or more light sources can be applied to the carrier front side, for example the front side of a wood layer or adhesive layer or the front side of an NFPP. For example, the one or more light sources can be LEDs that are applied directly to the carrier front side by printing and/or by embedding in one or two or more adhesive layers. The one or more light sources can also be a luminous adhesive layer, for example an adhesive layer provided with additives for luminescence, which is applied to the carrier front side. A masking, for example a printed masking, can be arranged between the one or more light sources, for example the LED or LEDs and/or the luminous adhesive layer, and the decorative layer rear side in order to only partially backlight the decorative layer. The electrical contact of the one or more light sources can be effected between the decorative layer rear side and the carrier front side, for example by means of an electrical conductor strip and/or conductor bundle and/or flex strip and/or tailout led out of the shaped part between the decorative layer rear side and the carrier front side, and/or via an opening in the carrier between the carrier front side and the carrier rear side, through which, for example, an electrical conductor strip and/or conductor bundle and/or flex strip and/or tailout is laid and led out of the shaped part at the carrier rear side.

A further development of the invention provides that the one or more light sources are arranged on the carrier rear side and/or in the carrier. Furthermore, the carrier has one or more openings between the carrier rear side and the carrier front side for transmitting light from the light source or light sources to the decorative layer rear side.

The advantages of this further development lie in particular in the fact that natural materials can be used as a carrier material while still enabling the carrier to be illuminated with the light from the light source or light sources for backlighting the decorative layer.

One configuration of the invention provides that the one or more light sources are arranged in the opening or openings of the carrier and/or on the carrier rear side at the opening or openings. Furthermore, it can be provided that the one or more light sources are embedded in or at the openings in a transparent or translucent plastic. The transparent or translucent plastic, which embeds the one or more light sources, can at least fill the opening or openings in the carrier and thus form a light guide through the carrier. For example, it can be provided with multiple openings filled with the transparent or translucent plastic, wherein the openings on the carrier rear side can be connected to one another via a plastic layer formed from the transparent or translucent plastic. This plastic layer can be arranged partially or over the entire surface of the carrier rear side.

The light source or light sources can be LEDs, for example.

If multiple light sources are provided, they can be connected together to form a light source network or a light source mat. The individual light sources can then be assigned to individual openings, in particular inserted into them or arranged at the start of them on the carrier rear side.

In a further development, it is provided that the one or more light sources are electrically connected via a contact arranged on the carrier rear side.

One configuration provides that the decorative layer and the carrier are connected to one another via a decorative adhesive layer, in particular a transparent or translucent decorative adhesive layer. The decorative adhesive layer can be formed from a bio-adhesive, i.e., a bio-based adhesive, such as a resin.

According to a further development, a partial or full-surface layer made bio-based plastic can be attached to the carrier rear side as an additional carrier layer. This layer can be produced by back-injection with a bio-based plastic granulate. With this layer, a required rigidity and/or breaking strength and/or splinter resistance of the shaped part can be achieved, which may not be sufficiently guaranteed without such layer.

The method according to the invention for producing the shaped part according to the invention described above comprises the following steps:

a) Providing or producing the decorative layer and the carrier formed at least partially from a natural material, b) Arranging the one or more light sources on the carrier rear side and/or in the carrier and/or between the decorative layer rear side and the carrier.

The advantages of the method according to the invention result from the above explanations of the shaped part according to the invention.

The decorative layer and the carrier can be produced together. The carrier can be injection-molded onto the decorative layer, wherein a bioplastic granulate can be used, for example. However, it is also possible to produce the decorative layer and the carrier separately, wherein, in such case, the decorative layer can be glued to the carrier.

A further development provides that the one or more light sources are arranged on the carrier rear side and/or in the carrier and one or more openings are produced in the carrier between the carrier rear side and the carrier front side. In particular, it can be provided that the one or more light sources are arranged in the opening or openings and/or on the carrier rear side at the opening or openings.

With the method according to the invention, according to a further development, it can be provided that the production of the opening or openings in the carrier is effected by punching and/or milling and/or lasering and/or etching. Punching and/or milling and/or lasering and/or etching can be effected, for example, before or after a formation of the carrier or the carrier already provided with the decorative layer. In the case of lasering with the decorative layer already attached to the carrier, lasering is effected from the carrier rear side, wherein, in order to prevent changes to the decorative layer due to lasering, a barrier layer that is transparent to visible light but cannot be lasered with the laser used is arranged and/or formed between the decorative layer and the carrier.

It is also possible that the opening or openings is back-injected with transparent or translucent plastic, wherein the opening or openings are filled with the transparent or translucent plastic and the one or more light sources are embedded in the transparent or translucent plastic. It can be provided that one or more light sources are pre-fixed in their position in or on the carrier prior to back injection.

Alternatively, it can also be provided that a lighting element comprising the one or more light sources is initially produced by embedding the one or more light sources in transparent or translucent plastic and subsequently the one or more light sources are arranged in or on the opening or openings by inserting the lighting element into the opening or openings.

According to a further development, a partial or full-surface layer of bio-based plastic can be applied to the carrier rear side as an additional carrier layer. This layer can be produced by back-injection with a bio-based plastic granulate. With this layer, a required rigidity and/or breaking strength and/or splinter resistance of the shaped part can be achieved, which may not be sufficiently guaranteed without such layer.

Figure 2:
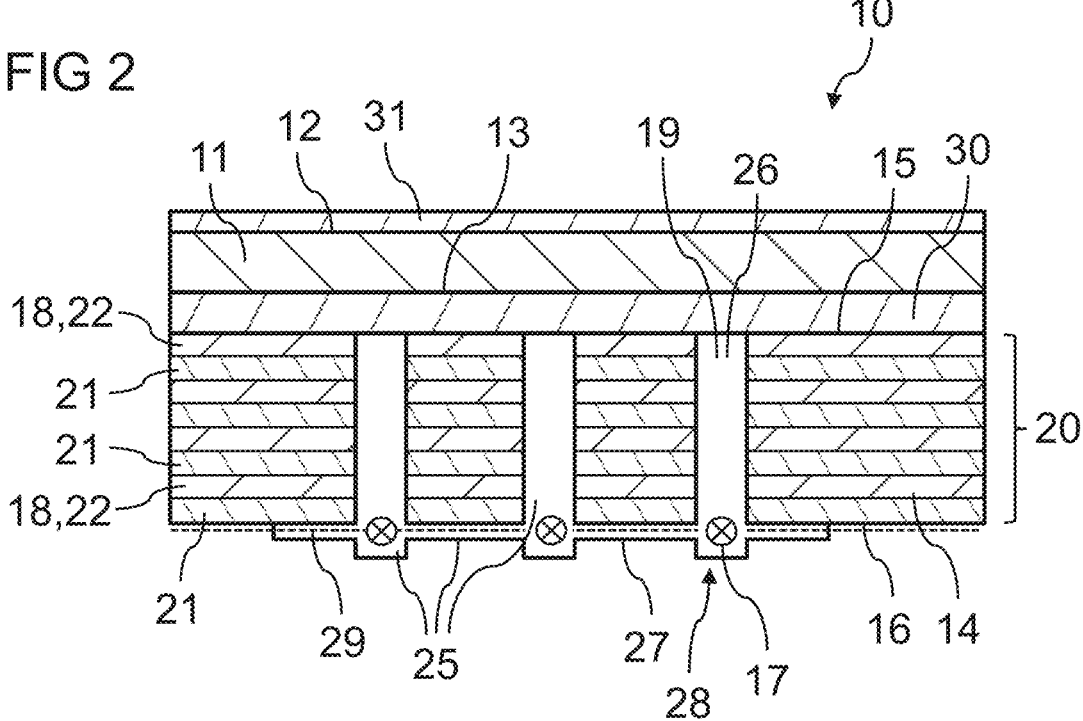

The invention is explained in more detail below also with regard to further features and advantages on the basis of the description of exemplary embodiments and with reference to the accompanying schematic drawing. In the figures:

FIG. 1 shows a schematic sectional representation of a detail of a first exemplary embodiment of a shaped part according to the invention, and FIG. 2 shows a schematic sectional representation of a detail of a second exemplary embodiment of a shaped part according to the invention.

Corresponding parts and components are also identified with the same reference numbers in each of the various exemplary embodiments.

FIG. 1 and FIG. 2 each show an exemplary embodiment of a decorative and/or panel part for the vehicle interior according to the invention, designed as a shaped part 10. The shaped part 10 comprises a decorative layer 11 with a decorative layer front side 12 formed as the visible side of the shaped part 10 and a decorative layer rear side 13 opposite the decorative layer front side 12. A carrier 14 is glued to the decorative layer rear side 13 via a decorative adhesive layer 30, which can be formed, for example, by a bio-adhesive, i.e., a bio-based adhesive, wherein the carrier has a carrier front side 15 facing the decorative layer rear side 13 and a carrier rear side 16 opposite the carrier front side 15. As an alternative to bonding with the decorative adhesive layer 30, the carrier 14 according to FIG. 2 can also be injection-molded onto the decorative layer rear side 13.

Furthermore, the shaped part 10 comprises multiple light sources 17 (three light sources 17 are shown). These light sources 17 are shown symbolically; they are arranged on the carrier rear side 16 and are used to backlight the decorative layer 11, i.e., the light emitted by the light sources 17 illuminates the decorative layer rear side 13. The light sources 17 can be LEDs, for example.

The light sources 17 could be individually designed and inserted in the shaped part 10. However, in the exemplary embodiments shown, the light sources are connected to one another to form a light source network 28. This light source network 28 can already be applied to the carrier rear side 16 during the production of the shaped part 10 and the individual light sources can be positioned at or in the openings 19 in the carrier 14. The electrical connection of the light sources 17 is effected via an electrical contact 29, symbolically represented by a dashed line in FIG. 1 and FIG. 2, which is arranged on the carrier rear side 16.

In the first exemplary embodiment shown in FIG. 1, the carrier 14 is formed by a natural material 18, specifically a bio-based material 23, specifically a natural fiber-reinforced plastic 24, for example a natural fiber-reinforced polypropylene (abbreviation: NFPP).

In the second exemplary embodiment shown in FIG. 2, the carrier 14 is a wooden layer structure 20, which comprises multiple wood layers 22 as natural material 18 (specifically shown are four wood layers 22), which are bonded together over their surface via layer structure adhesive layers 21 (specifically shown are three layered structure adhesive layers 21 between the four wood layers 22). In this second exemplary embodiment, the carrier 14 is thus also at least partially formed from a natural material. The adhesive of the layer structure adhesive layers 21 can be a bio-adhesive, i.e., a bio-based adhesive.

Furthermore, in the second exemplary embodiment shown, a further layer structure adhesive layer 21 is arranged on the carrier rear side 16, which closes off the wooden layer structure 20 and serves, for example, to connect further layers, such as the plastic layer 27, which is explained further below. In alternative configurations, this further layer structure adhesive layer 21 on the carrier rear side 16 can also be omitted.

Both the natural fiber-reinforced plastic 24 of the first exemplary embodiment and the wooden layer structure 20 of the second exemplary embodiment are opaque or at least not sufficiently translucent in order to enable the aforementioned backlighting of the decorative layer 11. In order to make this possible, the carrier 14 in both exemplary embodiments therefore has multiple openings 19 between the carrier rear side 16 and the carrier front side 15 for transmitting light from the light sources 17 to the decorative layer rear side 13; specifically, three openings 19 are shown.

The light sources 17 are arranged on the carrier rear side 16 at the openings 19. They can also be arranged in the openings 19. The light sources 17 are embedded in a transparent or translucent plastic 25, which fills the openings 19 in the carrier 14 and thus forms a light guide 26 through the carrier 14. Furthermore, the openings 19 on the rear of the carrier are connected to one another via a plastic layer 27 formed from the transparent or translucent plastic 25. In the illustrated exemplary embodiments, this plastic layer 27 extends partially over the carrier rear side 16, but it could alternatively also cover the entire carrier rear side 16.

As an alternative to the exemplary embodiments shown in FIG. 1 and FIG. 2, the light sources 17 can also be arranged between the decorative layer rear side 13 and the carrier 14 (not shown).

The exemplary embodiments of the shaped part 10 according to the invention shown in FIG. 1 and FIG. 2 can be produced, for example, by the following steps:

Initially, the decorative layer 11 and the respective carrier 14 are produced and/or provided. The decorative layer 11 and the carrier 14 can be produced together. The carrier 14 can be injection-molded onto the decorative layer 11, wherein a bioplastic granulate can be used, for example. However, it is also possible to produce the decorative layer 11 and carrier 14 separately, wherein, in such a case, the decorative layer 11 can be glued to the carrier 14. The openings 19 are then introduced into the carrier 14, for example by punching, milling or lasering. Alternatively, this can also be effected prior to the application of the decorative layer 11. If necessary, a formation of the carrier 14 and/or the decorative layer 11 can be effected prior to or after the application of the decorative layer 11 to the carrier 14 and/or prior to or after the introduction of the openings 19.

The embedding of the light sources 17 can be effected in the transparent or translucent plastic 25 by initially arranging the light sources 17 at or in the openings 19 in the desired position, pre-fixing them there if necessary and subsequently back-injecting the openings 19 with the transparent or translucent plastic 25. The openings 19 are filled with the transparent or translucent plastic 25. The plastic layer 27 is also formed during this back injection. The transparent or translucent plastic 25 can be a bio-based plastic, but it can also be a conventional plastic.

Alternatively, it is also possible to initially produce a lighting element comprising the light sources 17 by embedding the light sources 17 in the transparent or translucent plastic 25 and subsequently to arrange the embedded light sources 17 in or at the openings 19 by inserting the lighting element into the openings 19. If the lighting element is designed accordingly, in particular its shape, the openings 19 are also filled with the transparent or translucent plastic 25 and the plastic layer 27 is arranged on the carrier rear side 16. The fixing of the lighting element is effected on the carrier rear side 16, for example, via the layer structure adhesive layer 21.

| List of reference signs | |
| --- | --- |
| 10 | Shaped part |
| 11 | Decorative layer |
| 12 | Decorative layer front side |
| 13 | Decorative layer rear side |
| 14 | Carrier |
| 15 | Carrier front side |
| 16 | Carrier rear side |
| 17 | Light source |
| 18 | Natural material |
| 19 | Opening |
| 20 | Wooden layer structure |
| 21 | Layer structure adhesive layer |
| 22 | Wood layer of the wooden layer structure 20 |
| 23 | Bio-based material |
| 24 | Natural fiber-reinforced plastic, in particular NFPP |

-continued

| List of reference signs | |
|---|---|
| 25 | Transparent or translucent plastic |
| 26 | Light guide |
| 27 | Plastic layer |
| 28 | Light source network |
| 29 | Contact |
| 30 | Decorative adhesive layer |

The invention claimed is:

1. A shaped part, comprising
a decorative layer with a decorative layer front side formed as the visible side of the shaped part and a decorative layer rear side opposite the decorative layer front side,
a carrier arranged on the decorative layer rear side with a carrier front side facing the decorative layer rear side and a carrier rear side opposite the carrier front side, and
one or more light sources, which are arranged on the carrier rear side and/or in the carrier,
wherein the carrier has one or more openings between the carrier rear side and the carrier front side for transmitting light from the one or more light sources to the decorative layer rear side,
wherein the carrier is at least partially formed from a natural material, and
wherein the natural material of the carrier is wood and the carrier is a wooden layer structure, which comprises two or more wood layers bonded together over their surface via a layer structure adhesive layer in each case,
wherein a transparent or translucent protective and/or optical layer is arranged on the front side of the decorative layer.

2. The shaped part according to claim 1, wherein the adhesive of the layer structure adhesive layer is a bio-based adhesive.

3. The shaped part according to claim 1, characterized in that
the natural material of the carrier is a bio-based material.

4. The shaped part according to claim 3, characterized in that
the bio-based material is a natural fiber-reinforced plastic.

5. The shaped part according to claim 4, characterized in that
the natural fiber-reinforced plastic is a natural fiber-reinforced polypropylene.

6. The shaped part according to claim 1, characterized in that
a partial or full-surface layer of a bio-based plastic is attached to the carrier rear side.

7. The shaped part according to claim 1, characterized in that
the one or more light sources are arranged in the opening or openings of the carrier.

8. The shaped part according to claim 7, characterized in that
the one or more light sources are embedded in or at the openings in a transparent or translucent plastic.

9. The shaped part according to claim 8, characterized in that
the transparent or translucent plastic, which embeds the one or more light sources, fills at least the opening or openings in the carrier and thus forms a light guide through the carrier.

10. The shaped part according to claim 9, characterized in that
the one or more openings filled with the transparent or translucent plastic are provided, wherein the openings on the carrier rear side are connected to one another via a plastic layer formed from the transparent or translucent plastic.

11. The shaped part according to claim 1, characterized in that
the light source or light sources are LEDs.

12. The shaped part according to claim 1, characterized in that
the one or more light sources are provided, which are connected to one another to form a light source network or a light source mat.

13. The shaped part according to claim 1, characterized in that
the one or more light sources are electrically connected via a contact arranged on the carrier rear side.

14. The shaped part according to claim 1, characterized in that
the decorative layer and the carrier are connected to one another via a decorative adhesive layer.

15. A method for producing a shaped part according to claim 1, comprising the following steps:
a) providing or producing the decorative layer and the carrier formed at least partially from a natural material,
b) arranging the one or more light sources on the carrier rear side and/or in the carrier and/or between the decorative layer rear side and the carrier,
c) arranging the transparent or translucent protective and/or optical layer on the front side of the decorative layer.

16. The method according to claim 15, with which there is further provided:
arranging the one or more light sources on the carrier rear side and/or in the carrier, and
producing one or more openings in the carrier between the carrier rear side and the carrier front side.

17. The method according to claim 16, with which there is further provided:
arranging the one or more light sources in the opening or openings.

18. The method according to claim 16, with which there is further provided:
producing the openings in the carrier is effected by punching and/or milling and/or lasering and/or etching.

19. The method according to claim 16, with which there is further provided:
back injecting the opening or openings with transparent or translucent plastic, wherein the opening or openings are filled with the transparent or translucent plastic and the one or more light sources are embedded in the transparent or translucent plastic.

20. The method according to claim 19, with which there is further provided:
pre-fixing of one or more light sources prior to back injection.

21. The method according to claim 16, with which there is further provided:
a1) producing a lighting element comprising the one or more light sources by embedding the one or more light sources in transparent or translucent plastic, and
a2) arranging the one or more light sources in or on the opening or openings by inserting the lighting element into the opening or openings.

22. The method according to claim 15, with which a partial or full-surface layer of bio-based plastic is applied to the carrier rear side.

* * * * *